(12) United States Patent
Thomsen

(10) Patent No.: US 8,896,143 B2
(45) Date of Patent: Nov. 25, 2014

(54) ROTATION SENSOR ARRANGEMENT WITHIN A WIND TURBINE GENERATOR

(75) Inventor: Thyge Skovbjerg Thomsen, Herning (DK)

(73) Assignee: Siemens Aktiengellschaft, Munich (DE)

( * ) Notice: Subject to any disclaimer, the term of this patent is extended or adjusted under 35 U.S.C. 154(b) by 166 days.

(21) Appl. No.: 13/636,188

(22) PCT Filed: Dec. 20, 2010

(86) PCT No.: PCT/EP2010/070303
§ 371 (c)(1),
(2), (4) Date: Sep. 20, 2012

(87) PCT Pub. No.: WO2011/116845
PCT Pub. Date: Sep. 29, 2011

(65) Prior Publication Data
US 2013/0020807 A1  Jan. 24, 2013

(30) Foreign Application Priority Data
Mar. 26, 2010  (EP) .................................... 10157903

(51) Int. Cl.
| | | |
|---|---|---|
| H02P 9/04 | (2006.01) | |
| F03D 7/02 | (2006.01) | |
| H02K 11/00 | (2006.01) | |
| F03D 11/00 | (2006.01) | |
| H02K 7/18 | (2006.01) | |
| F03D 1/06 | (2006.01) | |

(52) U.S. Cl.
CPC ......... *F03D 11/00* (2013.01); *F05B 2220/7066* (2013.01); *Y02E 10/725* (2013.01); *F03D 7/0224* (2013.01); *F05B 2270/809* (2013.01); *H02K 11/0021* (2013.01); *Y02E 10/721* (2013.01); *Y02E 10/723* (2013.01); *H02K 11/0015* (2013.01); *H02K 7/1838* (2013.01); *F03D 1/065* (2013.01); *H02K 2213/06* (2013.01); *F05B 2270/326* (2013.01); *H02K 11/0026* (2013.01)
USPC .............................................. 290/44; 290/55

(58) Field of Classification Search
USPC ...................................... 290/44, 55; 310/60 R
See application file for complete search history.

(56) References Cited

U.S. PATENT DOCUMENTS

| | | | | |
|---|---|---|---|---|
| 4,435,659 A | * | 3/1984 | Peterson ...................... | 310/68 R |
| 7,431,567 B1 | | 10/2008 | Bevington | |
| 7,650,786 B2 | * | 1/2010 | Kabatzke ......................... | 73/510 |
| 8,261,599 B2 | * | 9/2012 | Jeffrey et al. ..................... | 73/66 |
| 2010/0148515 A1 | | 6/2010 | Geddry | |
| 2013/0127165 A1 | * | 5/2013 | Vihriala ......................... | 290/44 |

FOREIGN PATENT DOCUMENTS

| | | | |
|---|---|---|---|
| CN | 101427023 A | 5/2009 | |
| CN | 101655070 A | 2/2010 | |
| EP | 2157314 A1 | 2/2010 | |
| WO | WO 2005103489 A2 | 11/2005 | |
| WO | WO 2010142759 A1 | 12/2010 | |

\* cited by examiner

*Primary Examiner* — Vanessa Girardi

(57) ABSTRACT

Disclosed is a direct drive wind turbine including a plurality of blades connected to a hub, a generator including a stator and a rotor, the stator being fixed on a nacelle of the wind turbine and a rotation sensor having a static element and a moving element. The hub is directly connected to the rotor of the generator. The static element of the rotation sensor is mounted on a stationary element of the wind turbine, in particular the stator, at a distance from the rotation axis of the hub, and the moving element of the rotation sensor is mounted on the rotor of the generator at a distance from the rotation axis of the hub.

17 Claims, 5 Drawing Sheets

ROTATION SENSOR ARRANGEMENT WITHIN A WIND TURBINE GENERATOR

CROSS REFERENCE TO RELATED APPLICATIONS

This application is the US National Stage of International Application No. PCT/EP2010/070303, filed Dec. 20, 2010 and claims the benefit thereof. The International Application claims the benefits of European application No. 10157903.5 filed Mar. 26, 2010. All of the applications are incorporated by reference herein in their entirety.

FIELD OF INVENTION

The invention relates to a direct drive wind turbine, comprising a plurality of blades connected to a hub, a generator comprising a stator and a rotor, whereby the stator is fixed on a nacelle of the wind turbine and the hub is directly connected to the rotor, and a rotation sensor having a static element and a moving element.

BACKGROUND OF INVENTION

The wind turbine comprises a tower on which a nacelle is mounted by a yaw turning system. The nacelle supports a hub to which the blades are connected. In a conventional wind turbine the hub turns a main shaft which in turn drives a gear of a gearbox connected to a generator. In such wind turbines, the hub and main shaft rotate with a comparably low speed, whereas the generator rotates with a comparably high speed in order to achieve the network frequency, i.e. 50 Hz or 60 Hz, as required by the power networks to which the wind turbine is connected.

In order to reduce the production and maintenance costs associated with an additional gearbox, direct drive wind turbines are being introduced into wind parks. The principle of operation of a direct-drive wind turbine is disclosed in EP 2 157 314 A1, which is incorporated herein by reference, and in "Windkraftanlagen", Robert Gasch and Jochen Dreher, E W S., 6$^{th}$ edition 2010, Vieweg+Täubner.

In a direct drive wind turbine, the generator rotates with the speed of the rotor, since the rotor is directly structurally coupled to the hub, without any gearbox. For control of the wind turbine it is essential to keep the speed of the hub within an acceptable range. Therefore, the rotational speed of the hub must be monitored closely. To this end, a direct-drive wind turbine generally comprises a rotation sensor for monitoring the rotational velocity of the hub.

In a state of the art direct drive wind turbine described in U.S. Pat. No. 7,431,567 B1, the rotation sensor is suspended between the hub and the stator of the generator. Since there is no shaft in such a wind turbine, the rotation sensor is mounted on supports to keep the rotation sensor in place. Because the rotation sensor is large and is suspended in the cavity of the stator, access to components such as the hub is partially blocked, so that maintenance is made more difficult and time-consuming. For example, parts of the rotation sensor may first have to be dismantled in order to gain access to a cavity of the hub. Furthermore, this type of rotation sensor can only provide a low resolution of measurement, and also results in inaccuracies owing to movement between the hub and the stator. In order to accurately measure the rotational speed of the hub to be able to control the wind turbine, a minimum resolution of at least 300 steps or samples per revolution of the hub is necessary.

SUMMARY OF INVENTION

It is therefore an object of the present invention to provide an improved rotation sensor for a direct drive wind turbine which avoids the problems outlined above.

The object of the present invention is achieved by a direct drive wind turbine.

The object of the present invention is achieved by a direct drive wind turbine comprising a plurality of blades connected to a hub, a generator comprising a stator and a rotor, wherein the stator is fixed on a nacelle of the wind turbine and a rotation sensor having a static element and a moving element. The hub is directly connected to the rotor of the generator. The term "directly connected" within the context of a direct drive wind turbine is to be interpreted such that there is a gear connected between the hub including the blades and the rotor of the generator. The hub may be structurally connected to the rotor of the generator, e. g. by a structure element. The static element of the rotation sensor is mounted on a stationary element of the wind turbine, in particular the stator, at a distance from the rotation axis of the hub and the moving element of the rotation sensor is mounted on the rotor of the generator at a distance from the rotation axis of the hub.

The term "rotation axis" does not require that the hub be connected to a shaft or other physical axis. The "rotation axis" should be interpreted to define the axis about which the hub rotates. The hub may be connected to a hollow shaft, with a comparably large diameter, that rotates around a virtual axis of rotation.

The moving element and the stationary element of the rotation sensor are arranged at a distance from the rotation axis, which distance preferably comprises at least 25%, preferably at least 45%, more preferably at least 75%, most preferably at least 90% of the radius of the stator or rotor of the generator. If the moving element of the rotation sensor is positioned further away from the rotation axis of the hub, the rotation can be measured more accurately, even at low speeds of the hub, since measurement means can be arranged with a smaller angular separation on the moving element, compared to a moving element having a smaller distance from the rotation axis of the hub. Moreover, if—in a preferred embodiment—the moving element and the stationary element of the rotation sensor are arranged outside or at a radial border area of a cavity extending through the stator into the hub, maintenance staff may comfortably move through the stator cavity into the hub without encountering any significant obstacle and without the need to remove parts of the sensor.

Moreover, if—in a preferred embodiment—the moving element and the stationary element of the rotation sensor are arranged outside of a cavity of the Particularly advantageous embodiments and features of the invention are given by the dependent claims, as revealed in the following description.

The direct drive wind turbine may comprise a main bearing adapted to accommodate axial and radial forces. The main bearing may be located closer to the hub than a secondary bearing that can only accommodate radial loads. The moving element of the rotation sensor is arranged on a rotor portion that is proximal to the main bearing. A rotor portion of a generator proximal to the main bearing is supported in a more stable manner than a rotor portion of a generator being distal to a main bearing. Accordingly, a higher accuracy can be obtained if the moving element of the rotation sensor is arranged on a rotor portion that is proximal to the main bearing.

The moving element of the rotation sensor may be arranged on a rotor portion that accommodates the main bearing. For example, the moving element of the rotation sensor may be arranged on a side wall or flange of the rotor that accommodates the main bearing.

The moving element of the rotation sensor may be arranged on a rotor portion provided on the same side as the main bearing.

The moving element of the rotation sensor may be arranged on a rotor portion that is distal to the main bearing. Particularly, the moving element of the rotation sensor may be provided on a side of the generator that is opposite to the side, where the main bearing is located.

This arrangement has the advantage that the rotation sensor is accessible for maintenance, since the rotation sensor can be arranged outside the generator. However, this arrangement has the disadvantage that accuracy is reduced, since the rotation sensor is arranged at a greater distance from the main bearing. Thereby, tolerances and play are increased.

The moving element of the rotation sensor may be arranged on an inner surface of an outer rotor portion and the static element of the rotation sensor may be arranged on an outer stator portion opposite to the moving element of the rotation sensor. The radially outer rotor portion may be in the outer wall of the rotor. The outer portion of the stator may be the outer wall of the stator.

The rotor of the generator may be arranged around the stator of the generator. The stator of the generator may comprise an axially extending cavity essentially co-linear with the axis of rotation of the hub. The cavity is foreseen to provide access to the hub for maintenance purposes for maintenance staff. Preferably, the cavity has such a height that maintenance staff can walk through the cavity, i.e. the cavity is sufficiently large to allow an average-sized adult human to move through the stator cavity into a hub cavity. Therefore, a diameter of the cavity may comprises at least 1 m, more preferably at least 1.5 m, most preferably at least 2.5 µm.

The moving element of the rotation sensor may be arranged adjacent to a brake disc. The portion of the rotor on which the brake disc is arranged must be ridged accordingly. Accuracy can be increased if the moving element of the rotation sensor is arranged on the rotor adjacent to a brake disc.

The moving element of the rotation sensor may comprise an annular shape, for example a flat ring. On the ring, a plurality of indentations or slots, holes, grooves and the like are provided as measurement means or scale elements. Alternatively, the moving element of the rotation sensor may be formed integrally with the rotor, i.e. the moving element may be incorporated in the rotor. Indentations, slots, holes, grooves and the like may be formed in the rotor of the generator. The plurality of indentations, slots, holes and the like arranged around the ring or the rotor may act as a scale. Two different scales can be formed on the ring or on the rotor for reasons of redundancy.

The static element of the rotation sensor may comprise a Hall-effect sensor and/or an optical sensor. The Hall-effect sensor and/or the optical sensor may be adapted to detect the indentations, slots, holes, grooves and the like on the static element. The Hall-effect sensor may be adapted to detect the protrusions, slots, holes, grooves and the like of the first scale on the static element of the rotation sensor, whereas the optical sensor may be configured to detect the indentations, slots, holes, grooves and the like of the second scale of the static element of the rotation sensor. Thereby, redundant measurement results can be achieved that can be verified for consistency. By employing two different sensor types, a highly redundant rotation sensor for a direct drive wind turbine can be achieved.

The moving element of the rotation sensor may comprise a reference element indicating the absolute position of the moving element. The reference element may be a larger indentation, a larger slot, a larger hole, a larger groove, etc. Determining the absolute position of the rotor and/or of the hub may facilitate maintenance and compensating dynamic effects of the hub and the blades.

BRIEF DESCRIPTION OF THE DRAWINGS

Other objects and features of the present invention will become apparent from the following detailed description considered in conjunction with the accompanying drawings. It is to be understood, however, that the drawings are designed solely for the purposes of illustrations and not as a definition of the limits of the invention.

DETAILED DESCRIPTION OF INVENTION

Figure 1:
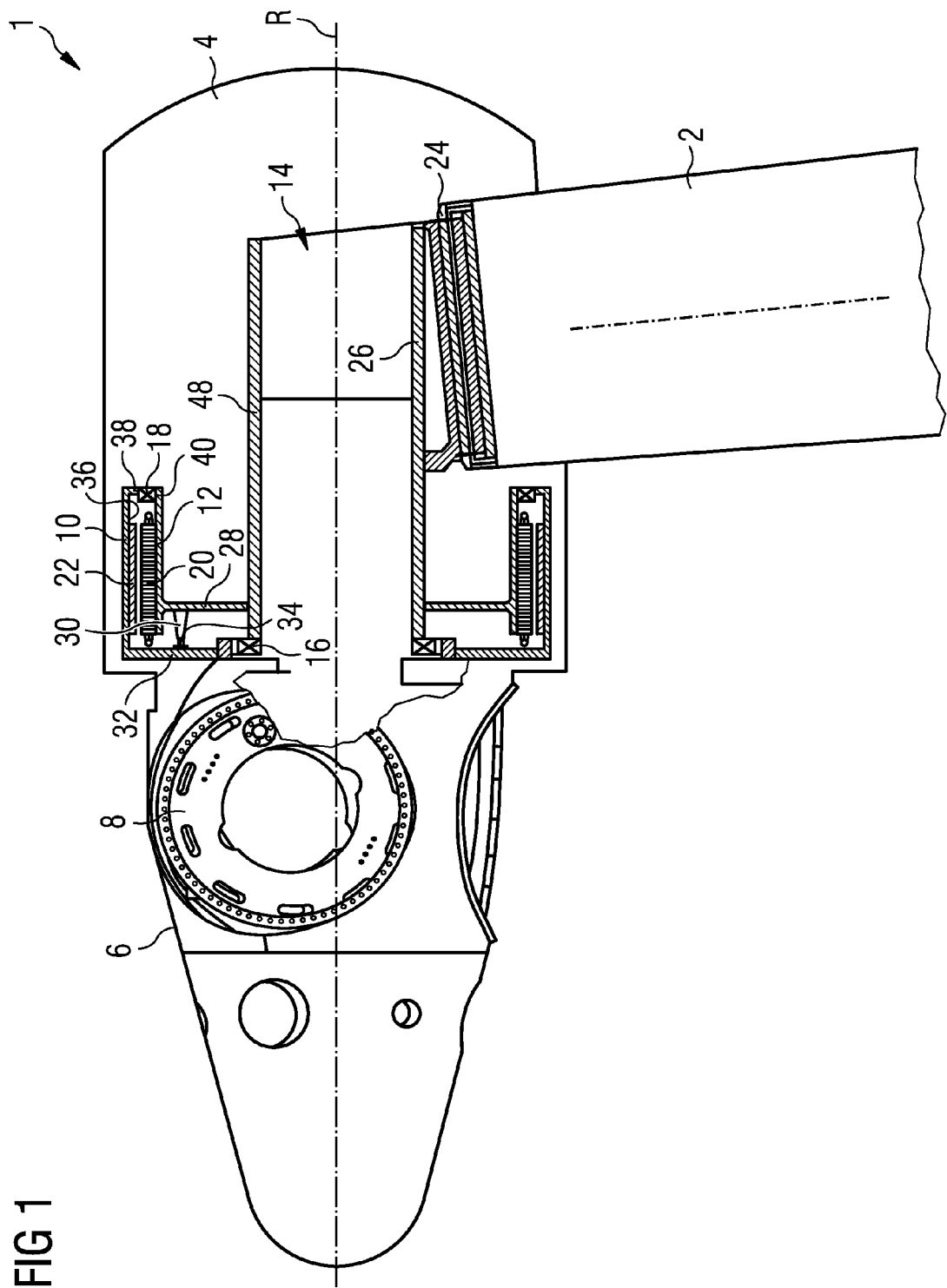
FIG. 1 shows a schematic cross-section of a first embodiment of a direct-drive wind turbine according to the present invention.

In the drawings, like references refer to like objects throughout. Objects in the drawings are not necessarily drawn to scale.

FIG. 1 shows a schematic cross-section of a first, preferred embodiment of a direct-drive wind turbine 1 according to the present invention. The wind turbine 1 comprises a nacelle 4 supported by a vertical tower 2. For the purposes of illustration, the nacelle 4 is shown horizontally, although the nacelle is usually inclined to the vertical axis of the tower 2 when installed in a wind park. The nacelle 4 comprises a stator 12 connected to a stator cavity 14 having a floor 26. Maintenance staff may walk through the stator cavity 14 on the floor 26 in order to access components of the wind turbine 1.

The wind turbine 1 further comprises a yaw system 24 to allow the nacelle 4 to rotate with respect to the tower 2.

Further, the wind turbine 1 comprises a hub 6 having blade attachments 8 on which the blades (not shown) may be mounted. The hub 6 is connected to the generator rotor 10 directly. No gear is connected between the hub 6 and the rotor 10. The rotor is supported by a main bearing 16 that can accommodate radial and axial loads, and a secondary bearing 18 on the stator that can only bear radial loads. The construction of the hub 6 and the connection of the hub 6 to the stator 12 is such that maintenance staff may walk through the stator cavity 14 into a cavity in the hub 6.

The rotor 10 comprises magnets 22. The stator 12 comprises windings 20.

The stator 12 is supported by a stator support 28 that extends on a wall of the stator cavity 14 radially outward. The stator comprises an outer stator portion 40 acting as a support for the windings 20 and the secondary bearing 18.

The generator rotor 10 is supported by the main bearing. Particularly, the generator rotor 10 comprises a front rotor flange 32 supported by the main bearing 16. The front rotor flange 32 supports an outer rotor wall 36 which is also supported by a rear rotor flange 38 supported by the secondary bearing 18.

This type of wind turbine does not comprise a shaft that is located at the axis of rotation of the hub 8 and the rotor 10. Therefore, this type of direct drive wind turbine can provide a stator cavity enabling maintenance staff to access the hub 6. Further, the hub 6 is mechanically coupled with the rotor 10 of the generator by a structure element, such as a tubular body. There may be no bearing interconnected between the hub 6 and the rotor 10. This type of direct drive wind turbine is also discussed in EP 2 157 314 A1.

With reference to FIG. 1, the first embodiment of a direct drive wind turbine having the inventive rotation sensor 30, 34 is described. The rotation sensor comprises a static element 30 and a movable element 34. The movable element 34 may comprise a Hall-effect sensor and/or an optical sensor. The movable element 34 may be a disc comprising grooves, slots, indentations, holes and the like that can be detected by the sensor of the static element 30. The movable element 34 can be formed integral with the rotor 10. In the first embodiment, the movable element 34 may be formed integral with the front rotor flange 32.

The first embodiment is shown in FIG. 1. The static element 30 of the rotation sensor is arranged on the stator support 28 arranged on a stator cavity wall 48 of the stator cavity. The movable element 34 of the sensor is arranged on the front rotor flange 32 supported by the main bearing 16. The movable element 34 is radially spaced apart from the axis of rotation R of the hub 6. Therefore, the movable element 34 comprises a large circumference and thus provides a comparable high resolution. The larger the radial distance of the movable element 34 of the rotation sensor from the rotation axis R, the higher the resolution of the rotation sensor. Although the movable element 34 of the rotation sensor is spaced apart from the rotational axis R for a comparably high value, the movable element 34 of the rotation sensor is still located close the main bearing 16.

As mentioned before, the main bearing 16 supports the rotor 10 and particularly the front rotor flange 32. Accordingly, the front rotor flange 32 and the movable element 34 are supported in a comparatively rigid manner and exhibit a comparatively small play compared to components arranged close to the secondary bearing 18, which only provides support in the radial direction. Accordingly, the first embodiment provides a direct drive wind turbine having a rotation sensor 30, 34 providing a comparably high accuracy.

Figure 2:
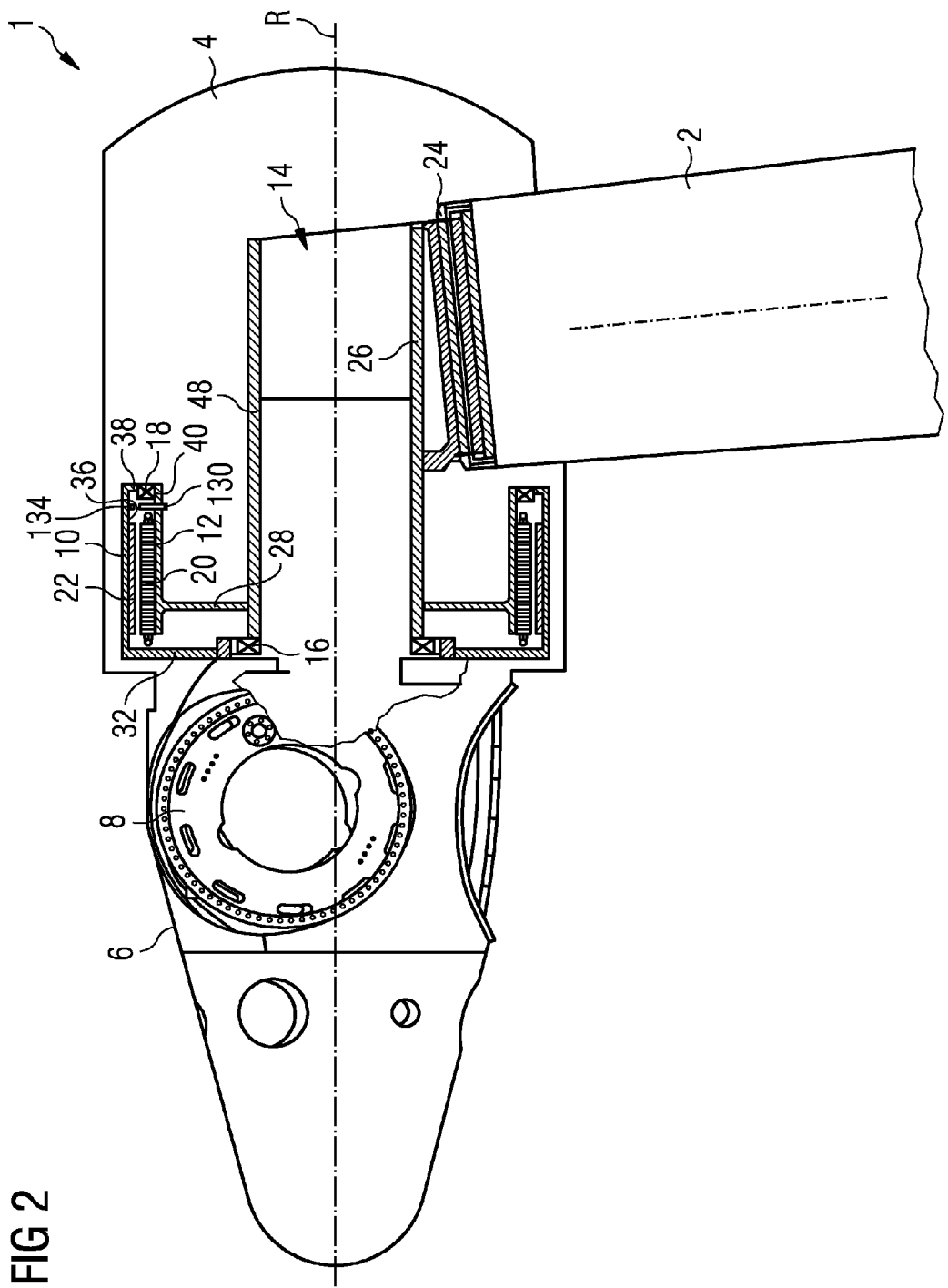
FIG. 2 shows a schematic cross-section of a second embodiment of a direct-drive wind turbine according to the present invention.

Reference is made to FIG. 2, which shows a second embodiment of a direct drive wind turbine having a rotation sensor 130, 134. The static element 130 of the sensor is located on an outer stator portion 40. The moving element 134 of the rotation sensor is located on the inner surface of an outer rotor wall 36. The moving element 134 of the rotation sensor may be a disc having a scale, such as a series of indentations, slots, grooves, holes and the like, or may be formed integrally with the outer rotor wall 36. This embodiment provides the advantage that the static element 130 of the rotation sensor may be accessed for maintenance purposes. Further, the movable element 134 of the rotation sensor is spaced apart further from the axis of rotation R compared to the rotation sensor according to the first embodiment shown by FIG. 1. Therefore, the movable element 134 provides a higher resolution as compared to the first embodiment. However, the outer rotor wall 36, on which the movable element 134 of the rotation sensor isolated, is mainly supported by the secondary bearing 18 providing only radial support to the rear rotor wall 38 and thus to the outer rotor flange 36. Accordingly, the movable element 134 of the rotation sensor may exhibit a greater degree of play, which may potentially reduce the overall accuracy.

Figure 3:
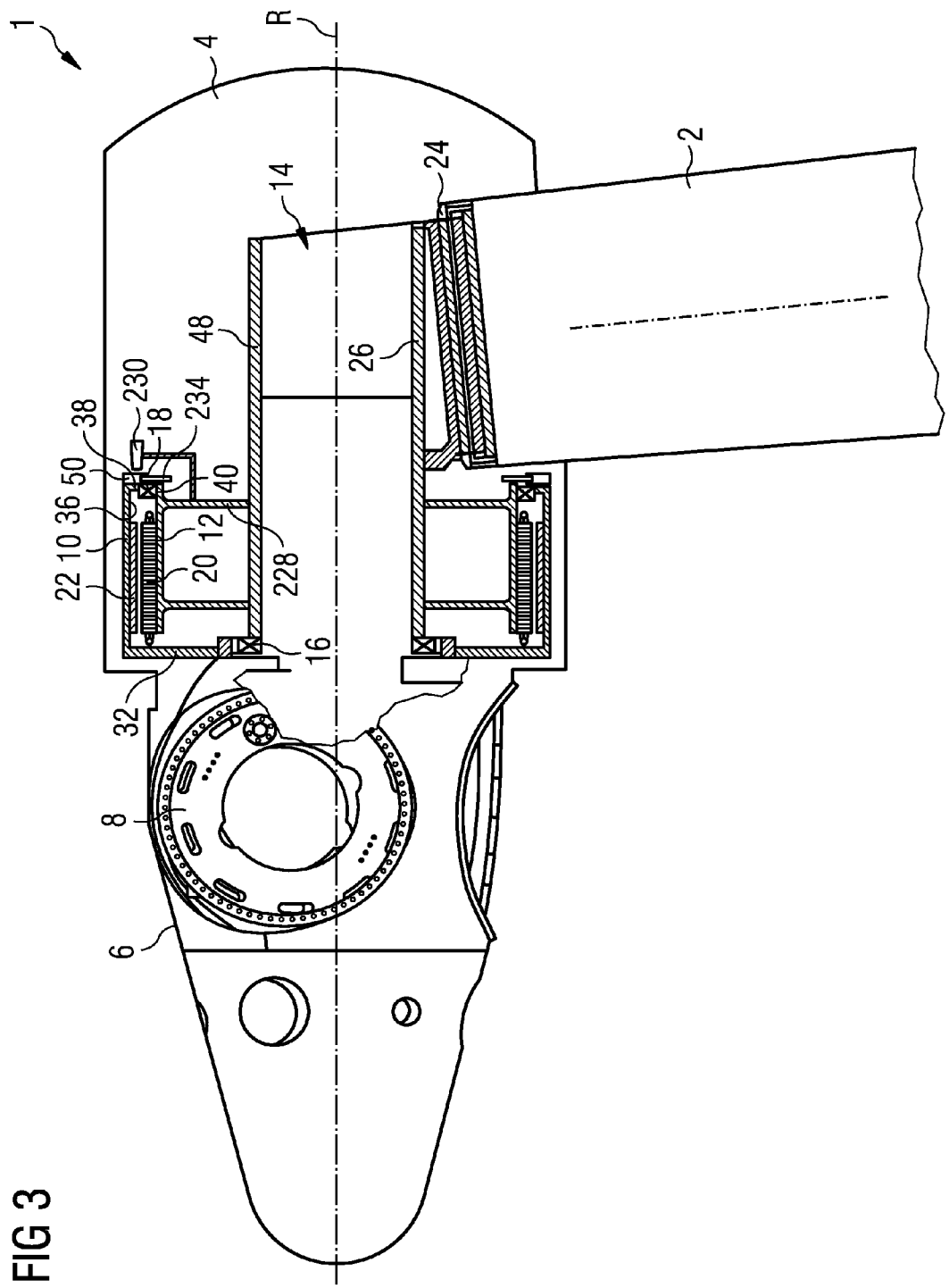
FIG. 3 shows a schematic cross-section of a third embodiment of a direct-drive wind turbine according to the present invention.

Reference is made to FIG. 3 showing a third embodiment of the direct drive wind turbine having the inventive rotation sensor. A brake disc 50 may be mounted on the rear rotor flange 38. The movable element 234 may be mounted next to the brake disc 50 or on the rear rotor flange 38. The fixed element 230 of the rotation sensor may be connected to a rear stator support 228. In this embodiment, both the static element 230 and the moving element 234 of the rotation sensor are accessible by maintenance staff. Neither the static element 230 nor the moving element 234 is covered by any part of the rotor 10 or stator 12. The moving element 234 of the rotation sensor can be incorporated in the rotor rear flange 38.

Since the movable element 234 of the rotation sensor is located near the secondary bearing 18, which only provides radial support, the movable element 234 may be subject to axial play and deviation from the axial position. Thus, the static sensor element 230 must have a detection range larger than the axial position tolerance of the static element 234.

Figure 4:
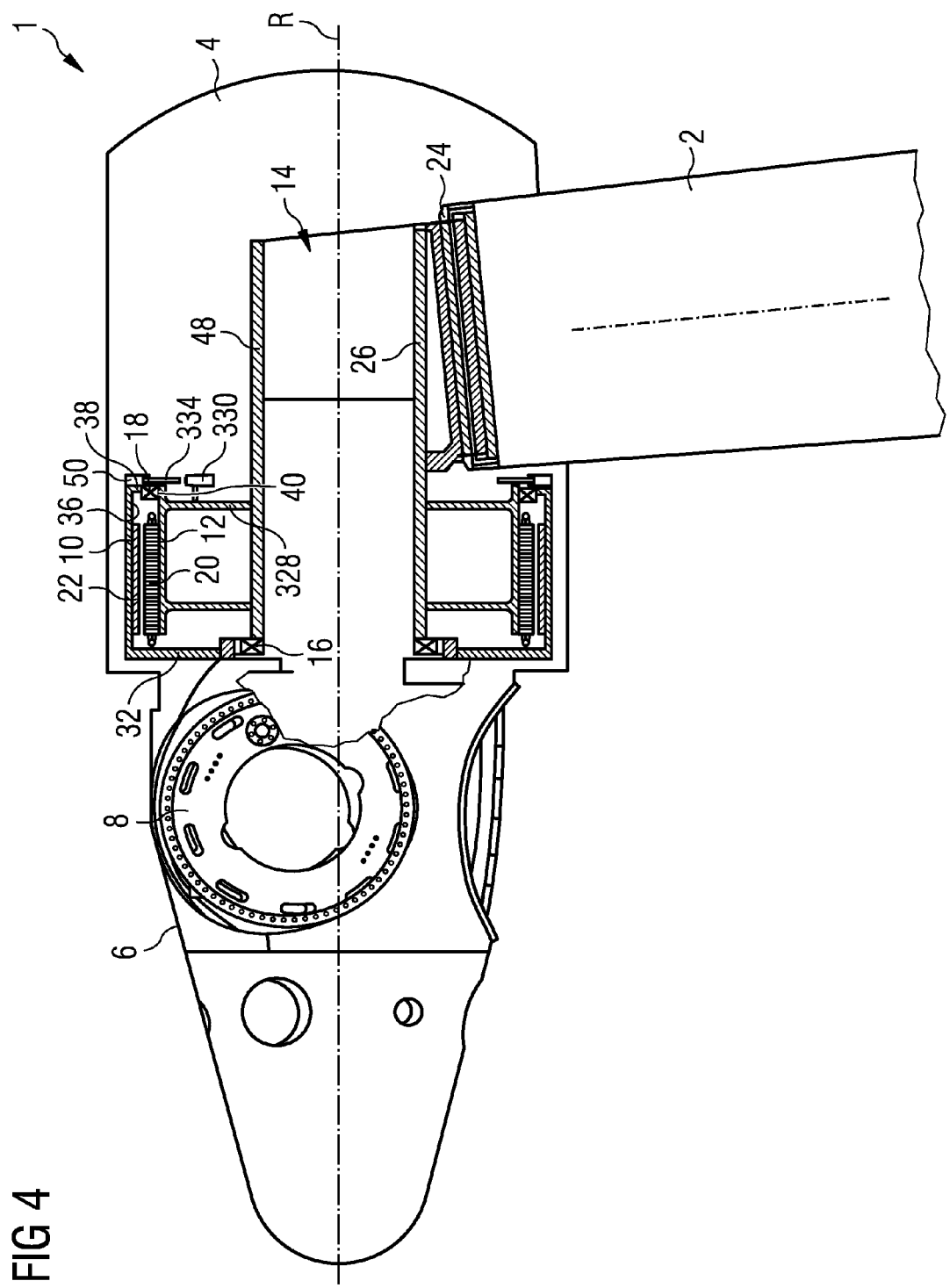
FIG. 4 shows a schematic cross-section of a fourth embodiment of a direct-drive wind turbine according to the present invention.

FIG. 4 shows a fourth embodiment of the direct drive wind turbine having the inventive rotation sensor. In the embodiment of FIG. 3 the scale of the movable element 234 has to be detected in the axial direction. In the embodiment of FIG. 4 the scale of the movable element 334 has to be detected in the radial direction. As with the embodiment according to FIG. 3 the movable element 334 of the rotation sensor is arranged on the rear rotor flange 38. The brake disc 50 may be provided on the rear rotor flange 38. The static element 330 of the rotation sensor may be provided on a rear stator support 328. The movable element 334 of the rotation sensor is located close to a secondary bearing 18 only providing support in the radial direction. Accordingly, the scale of the movable element 334 may have a play in the axial direction. However, such play or position tolerance of the movable element 334 does not change the distance between the static sensor element 330 comprising a detection unit such as a Hall-effect sensor and/or an optical sensor. Thereby, reliability of the rotation sensor can be increased as compared to the embodiment of FIG. 3. The scale of the movable element 334 must have such an axial length that at least a part of the scale can be determined by the static sensor element 330 independent of the axial position of the movable sensor element 334.

As with the third embodiment according to FIG. 3, the fourth embodiment provides the advantage that both the static sensor element 330 and the movable sensor element 334 are accessible for maintenance purposes.

Figure 5:
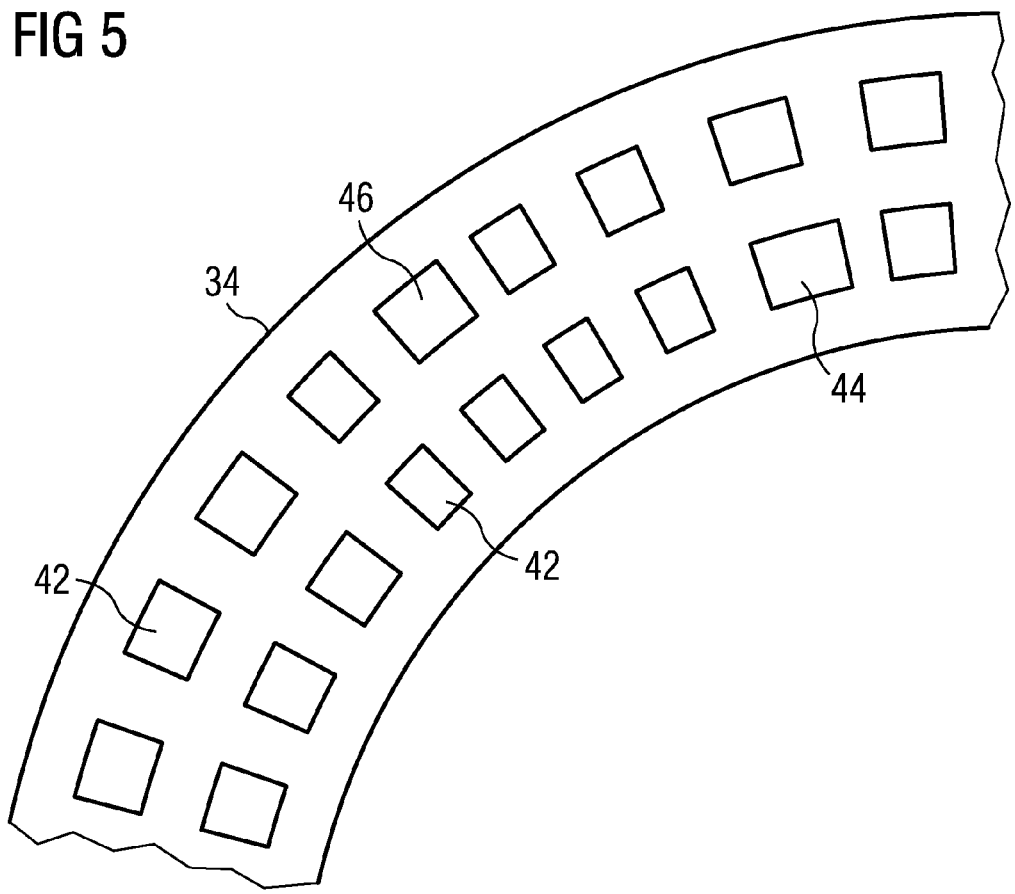
FIG. 5 shows a rotating element of a rotation sensor having two redundant scales.

FIG. 5 shows an exemplary movable element 34 of the rotation sensor. The movable element 34 comprises two scales arranged radially spaced apart. Each scale comprises scale elements 42 that may be formed by holes, slots, grooves, indentations and the like. The scale element 42 is detected by the static element of the rotation sensor, such as a Hall-effect sensor and/or an optical sensor. FIG. 5 shows the redundant arrangement of two such scales. The scale elements 42 of the radially inner scale may be detected by a Hall-effect sensor. The scale element 42 of the radially outer scale may be detected by an optical sensor. Thereby, the rotation frequency of the generator rotor may be determined redundantly.

The inner scale of the movable element comprises an inner reference element 44. The inner reference element 44 is larger in size than the other scale elements 42. Thereby, the absolute position can be determined. The radially outer scale comprises an outer reference scale element 46. The inner reference scale element 44 may be detected by a first detecting unit arranged on the static sensor element, and the outer reference scale element 46 may be detected by the second detecting unit arranged on the static sensor element. Thereby, the reference position may be determined independently by the first and second detecting unit. Since the inner reference scale element and the outer reference scale element are arranged on different angular positions, the reference position can be determined redundantly.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A direct drive wind turbine, comprising:
   a nacelle;
   a plurality of blades connected to a hub;
   a generator comprising a stator and a rotor, the stator being fixed on the nacelle; and
   a rotation sensor comprising a static sensor element and a moving sensor element,
   wherein the hub is directly connected to the rotor,
   wherein the static sensor element is mounted on the stator at a distance from the rotation axis of the hub, and
   wherein the moving sensor element is mounted on the rotor at a distance from the rotation axis of the hub.

2. The direct drive wind turbine according to claim 1,
   wherein the moving sensor element is arranged in the inner surface of an outer rotor portion, and
   wherein the static sensor element is arranged on an outer stator portion opposite to the moving element of the rotation sensor.

3. The direct drive wind turbine according to claim 1,
   wherein the moving sensor element is arranged on a brake disk.

4. The direct drive wind turbine according to claim 1,
   wherein the moving sensor element is arranged close to a brake disk.

5. The direct drive wind turbine according to claim 1,
   wherein the rotor is arranged around the stator.

6. The direct drive wind turbine according to claim 1,
   wherein the moving sensor element comprises an essentially flat annular shape.

7. The direct drive wind turbine according any one of claim 1,
   wherein the moving sensor element is formed integrally with the rotor.

8. The direct drive wind turbine according any one of claim 1,
   wherein the static sensor element comprises a Hall-effect sensor and/or an optical sensor.

9. The direct drive wind turbine according any one of claim 1,
   wherein the moving sensor element comprises a reference element indicating the absolute position of the moving element.

10. The direct drive wind turbine according any one of claim 1,
    wherein the moving sensor element comprises two redundant scales.

11. The direct drive wind turbine according to claim 1, comprising:
    a main bearing configured to accommodate axial and radial forces,
    wherein the moving sensor element is arranged on a rotor portion that is proximal to the main bearing.

12. The direct drive wind turbine according to claim 11,
    wherein the moving sensor element is arranged on a rotor portion that accommodates the main bearing.

13. The direct drive wind turbine according to claim 11,
    wherein the moving sensor element is arranged on a rotor portion provided on the same side as the main bearing.

14. The direct drive wind turbine according to claim 11,
    wherein the moving sensor element is arranged on a rotor portion that is distal to the main bearing.

15. The direct drive wind turbine according to claim 1,
    wherein the stator comprises an axially extending cavity essentially co-linear with the axis of rotation of the hub,
    wherein the cavity is dimensioned to provide access to the hub for maintenance purposes, and
    wherein a diameter of the cavity comprises at least 1 m.

16. The direct drive wind turbine according to claim 15,
    wherein a diameter of the cavity comprises at least 1.5 m.

17. The direct drive wind turbine according to claim 15,
    wherein a diameter of the cavity comprises at least 2.5 m.

* * * * *